Fig. 7

Jan. 1, 1952  B. ROBERTS  2,581,144
CONTROL OF OFFICE DICTATION EQUIPMENT
Original Filed Dec. 21, 1946  8 Sheets-Sheet 4

Fig. 8.

INVENTOR
Bruce Roberts
BY
Synnestvedt-Lechner
ATTORNEYS

Jan. 1, 1952    B. ROBERTS    2,581,144
CONTROL OF OFFICE DICTATION EQUIPMENT
Original Filed Dec. 21, 1946    8 Sheets-Sheet 6

INVENTOR
Bruce Roberts
BY
Synnestvedt & Lechner
ATTORNEYS

Patented Jan. 1, 1952

2,581,144

UNITED STATES PATENT OFFICE 2,581,144

CONTROL OF OFFICE DICTATION EQUIPMENT

Bruce Roberts, Philadelphia, Pa., assignor to The International Electronics Company, Philadelphia, Pa., a corporation of Pennsylvania Original application December 21, 1946, Serial No. 717,754. Divided and this application March 27, 1947, Serial No. 737,692

13 Claims. (Cl. 179—6)

I. GENERAL CONSIDERATIONS AND STATEMENT OF OBJECTS

This invention relates to control systems for office dictation and intercommunication equipment of the type disclosed and claimed in my copending application Serial No. 717,754, filed December 21, 1946, of which this application is a division. In that application, I have described apparatus for recording intelligence on rectangular flexible sheets comprising particles of magnetizable material dispersed in a binder and capable of folding and creasing without injury. Such sheets are as readily adapted to immediate disposition by mailing or filing as are typewritten letters.

While such apparatus may be employed as a simple unitary device for producing in physical form letters, memoranda, and the like, simultaneously with their utterance by their originator, the adaptability of the recordings to immediate disposition may be exploited more fully in an integrated system of dictation and intercommunication, in which such a unitary device is associated with other apparatus, with means whereby recordings may be made or reproduced at a location removed from the location of the person originating them or listening to them. The present application is concerned with control features disclosed in my copending application, Serial No. 717,754, and especially with a system of recording and intercommunication in which memoranda, letters, and the like may be reduced to a permanent physical form at a point remote from their utterance.

A primary object of the present invention is to provide for control and operation of dictating apparatus of the type described at a location removed therefrom.

Another object of the invention is to provide means for establishing intercommunication between the recording apparatus and the remote operating position, by means of which the activities of two persons stationed at the respective positions may be coordinated. The combination of the unitary device with intercommunication facilities constitutes a system for dealing with office dictation in which letters or memoranda may be dictated from one location and recorded in another location, and in which instructions as to the disposition of the recorded material may be transmitted to the second location by means of the same circuits and the same equipment.

The invention thus contemplates that certain of the elements of the unitary device will be employed alternatively for a plurality of purposes, including recording, reproduction, intercommunication and control.

A further object of the invention is to provide for reproduction of recordings immediately after they have been made, or upon the lapse of time after their making, either at the location of the recording apparatus or at a location remote therefrom.

How the foregoing and other objects are attained will be more fully understood upon reference to the description contained hereinbelow and the drawings, in which.

While this application is particularly concerned with control features of my novel dictation and intercommunication system, a thorough understanding of the control features depends upon a knowledge of the basic apparatus, and, to that end, I have included herein a discussion of the mechanical features of the basic unit claimed in my copending application; Serial No. 717,754.

II. GENERAL DISCUSSION OF THE MASTER UNIT

Figure 1:
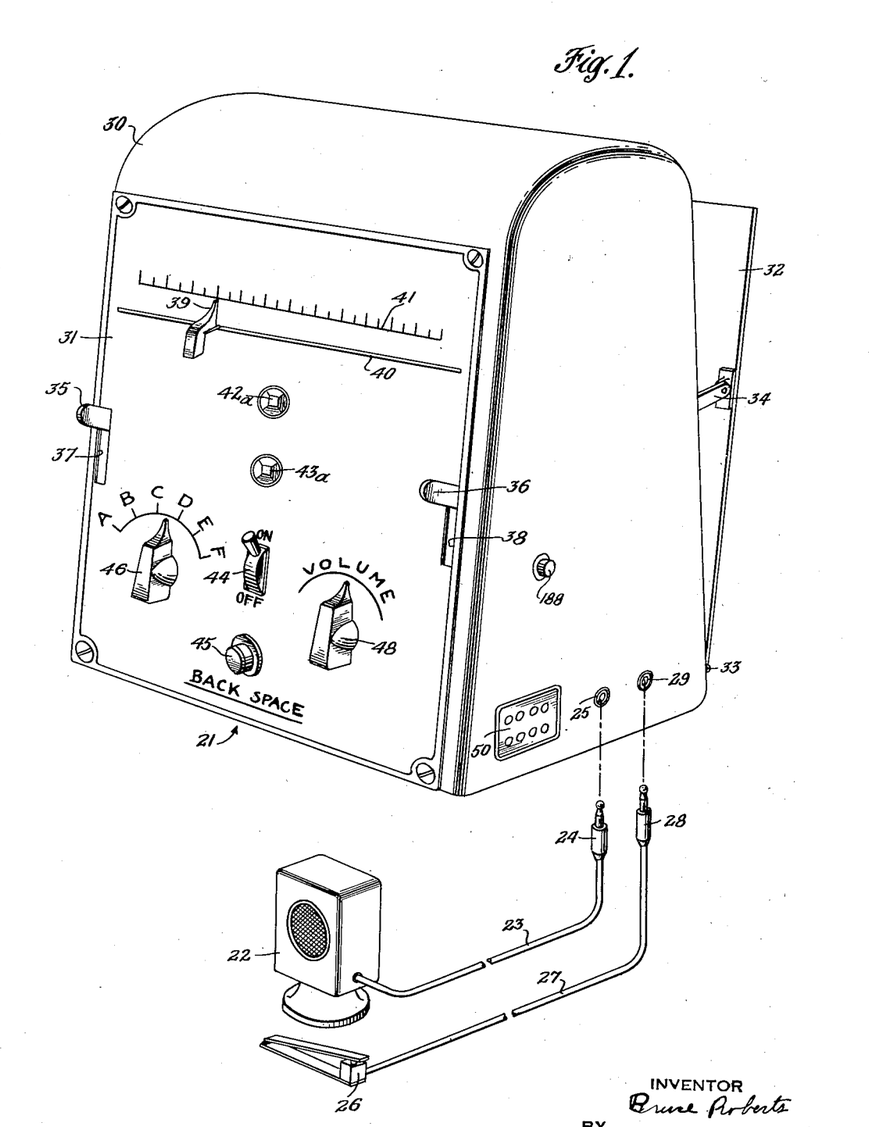
Figure 1 is a perspective view of a master recording unit constructed in accordance with the invention and of its associated speaker-microphone and foot switch.

Turning now to the drawings and considering first the above-mentioned unitary device itself, Figure 1 is an exterior view of a master unit, generally indicated at 21, which is mounted in and upon a cabinet generally indicated at 30. Associated with the master unit is a local speaker-microphone unit 22, adapted to be connected with the master unit by means of cord 23, plug 24, and jack 25. Local foot switch 26 is similarly adapted to be connected with the master unit by means of cord 27, plug 28, and jack 29.

Cabinet 30 includes a front panel 31, upon which are mounted various control elements and indicating elements, and an extendable back panel 32, hinged to the rear of the cabinet at 33, and maintained in adjustable position by spacer link 34.

Paper feed lever 35 and paper eject lever 36 penetrate apertures 37 and 38 respectively, at the left and right edges of panel 31. Recording status pointer 39 penetrates a slot 40 extending substantially across panel 31, just below scale 41. As the recording operation progresses, pointer 39 advances along the scale, permitting a measurement of the recording space or time already utilized, or alternatively, the amount of recording space or time yet available.

Disposed centrally of panel 31 are a pair of signal bezels, 42a and 43a, preferably of different colors, adapted to be illuminated by a pair of signal lamps, 42b and 43b respectively (see Figure 17) under certain conditions, as will appear more fully hereinbelow.

Immediately below the bezels is a power switch 44; and below the power switch is a push button switch 45 for controlling the back spacing mechanism.

Figure 16:
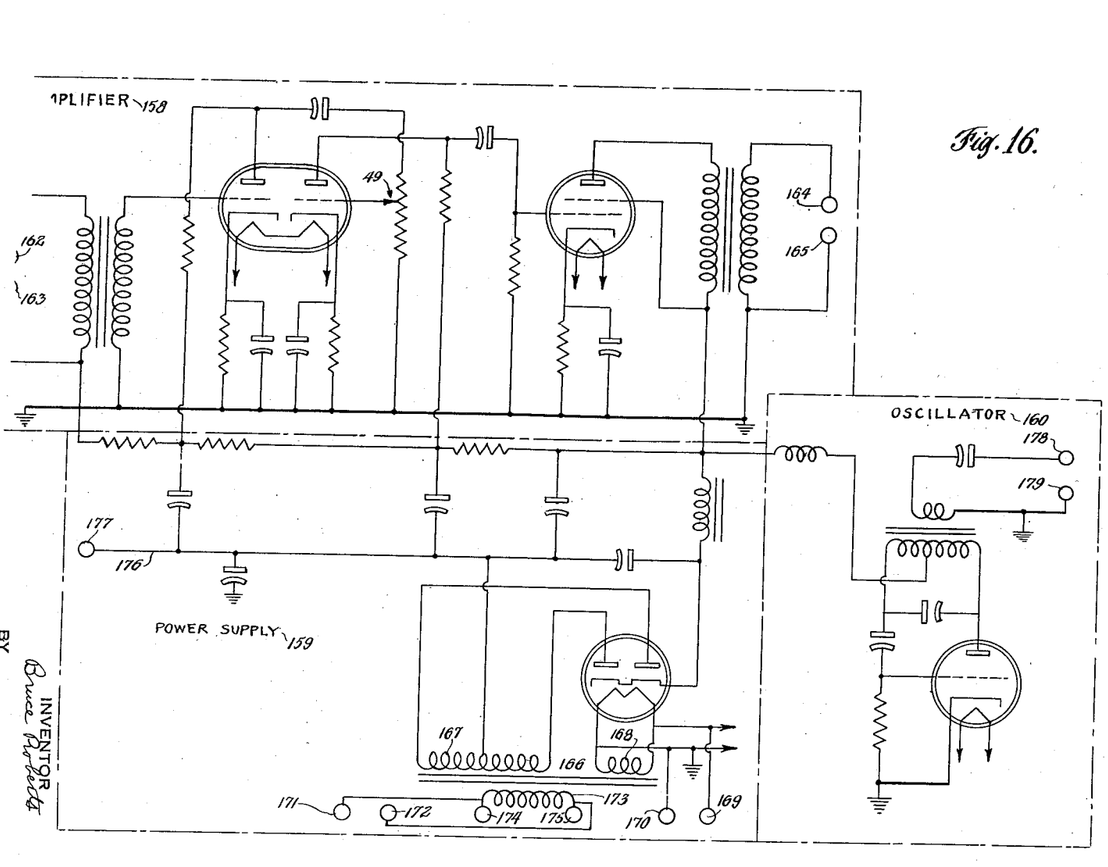
Figure 16 is a schematic diagram of the amplifier, oscillator, and power supply circuits.

To the left of toggle switch 44 is control knob 46 for multi-position gang switch 47 (see Figure 17) and to the right of the toggle switch is volume control knob 48 for volume control 49 (see Figure 16).

Figure 2:
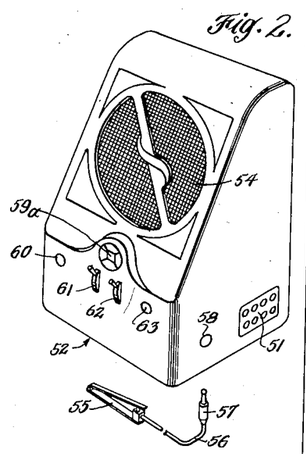
Figure 2 represents a remote unit, together with its associated foot switch.

On the side of cabinet 30, adjacent jack 25, is a multi-connector socket 50 adapted to be connected with a similar socket 51 on remote speaker-microphone unit 52 (see Figure 2). The sockets may be connected by a multi-conductor cable of conventional design or by any other means; the cable is schematically indicated at 54 in Figure 17.

III. GENERAL DISCUSSION OF THE REMOTE UNIT

Remote unit 52 includes a built-in permanent magnet loudspeaker 53 (see Figure 17), which functions as either a microphone or a loudspeaker, as is well known in the art, mounted behind a grill 54. Foot switch 55, similar in structure and function to foot switch 26, is adapted to be removably connected with remote unit 52 through cord 56, plug 57, and jack 58.

Mounted on the front panel of the remote unit is a bezel 59a, adapted to be illuminated by lamp 59b (see Figure 17) under certain circumstances, as will appear; signalling push button 60; a hold down talk-listen toggle switch 61; privacy toggle switch 62; and back space push button 63.

IV. THE RECORDING MEDIUM

Figure 3:
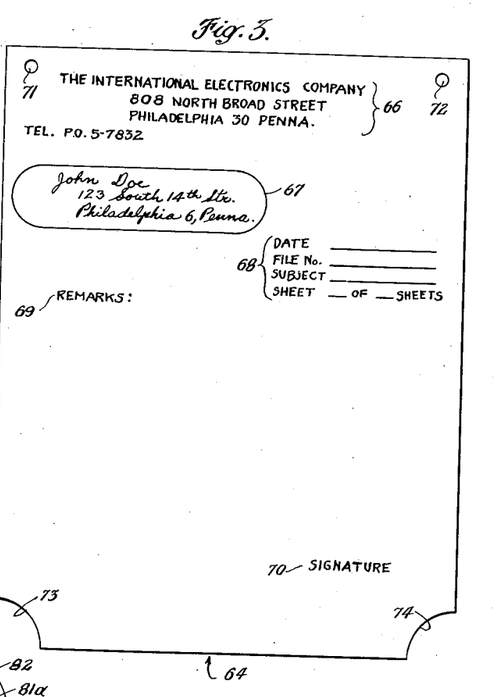
Figure 3 represents the reverse of a record sheet for use in the practice of the invention.

Turning now to the recording medium, Figure 3 is an example of a recording sheet 64 bearing on its uncoated side a letterhead 66, space for address 67, classification indicia 68, a heading 69, and signature location indicia 70. The address space is defined by a box providing a reference for registration of the address with the window of a standard window envelope. It is especially important, in records whose context is not visually comprehensible, to provide means for indicating the relative order and number of the sheets comprising a multi-sheet record, and to that end, I have provided means for indicating the position of each sheet in such a series.

The record sheet may be of any convenient size, but preferably, as illustrated in Figure 3, the sheet should be of standard letter size, for example, 8½" by 11". By standardizing on this size and shape of record sheet, all the auxiliary equipment of letter communication becomes available; for example, standard envelopes, standard file folders, standard file cabinets and the like may advantageously be employed in the storage and handling of record sheets of this size.

In addition to the dimensions, the plan form of the sheet is characterized by holes 71 and 72 and notched corners 73 and 74, which together cooperate in maintaining the record sheet in scanning position in my novel recording apparatus, as will appear more fully hereinbelow.

Figure 4:
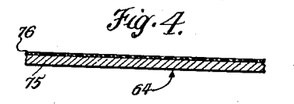
Figure 4 is a sectional view of a portion of a record sheet made in accordance with the invention.

As shown in the sectional view of Figure 4, the sheet 64 comprises a flexible layer 76 comprising magnetizable particles, preferably supported by a flexible backing 75.

Backing member 75 comprises a highly flexible, resilient material, such as paper, characterized by great resistance to cracking upon folding and creasing, and the ability to assume a substantially flat form after flexure to a closed loop or after creasing. The binder for the magnetizable particles has similar properties, and therefore a record medium made in accordance with the invention is capable of repeated flexing to cylindrical form and of repeated creasing and uncreasing without disturbance of the bond between the magnetizable material and the backing member, and without interference with the orientation of the individual magnetizable particles in relation to each other. The resilience of the material operates to restore it to flat form as it is released from the cylinder, which is not only advantageous for purposes of ultimate disposition, but also aids in removing the sheet from the machine, as will appear.

I have found that the best combination of the properties above discussed is obtained with a sheet of from about one to about five thousandths of an inch in thickness, and most desirably, with sheets from two to three thousandths of an inch thick.

V. SUPPORTING AND MAINTAINING THE RECORD SHEET IN FLEXED FORM

Figure 5:
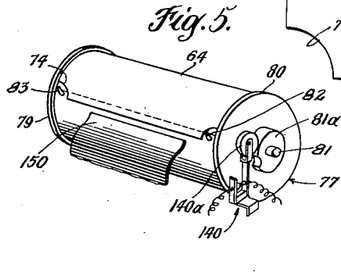
Figure 5 is a perspective view of the paper cylinder of the master unit, shown with a single sheet of paper wrapped thereon.

During recording and reproduction, a sheet 64 is supported upon a cylindrical form generally indicated at 77 in Figure 5. Cylinder 77 comprises a barrel 78 of non-magnetic material, for example, brass, and two end flanges 79 and 80, the diameter of the flanges preferably being slightly greater than that of the barrel 78. Cylindrical form 77 is adapted to be mounted by means of a shaft 81, which protrudes beyond flanges 79 and 80 at either end.

Form 77 is provided with a pair of hooks 82 and 83, projecting from barrel 78 near the ends thereof, in the same radial plane, and adapted to engage the holes 71 and 72 in sheet 64.

The circumference of the barrel should be no greater than the length of sheet 64; and preferably the circumference should be somewhat less than the length of the sheet, in order to provide for a slight overlap when the sheet is wrapped around the barrel. In the preferred form of the invention, standardized on the basis of 8½" by 11" paper, the circumference of the cylinder is approximately 10½". Under these circumstances, notches 73 and 74 permit the paper to lie flat without interference from hooks 82 and 83, even though the notched (or bottom) end of the sheet overlaps the opposite end.

VI. CYLINDER MOUNTING AND CYLINDER DRIVE

Figure 7:
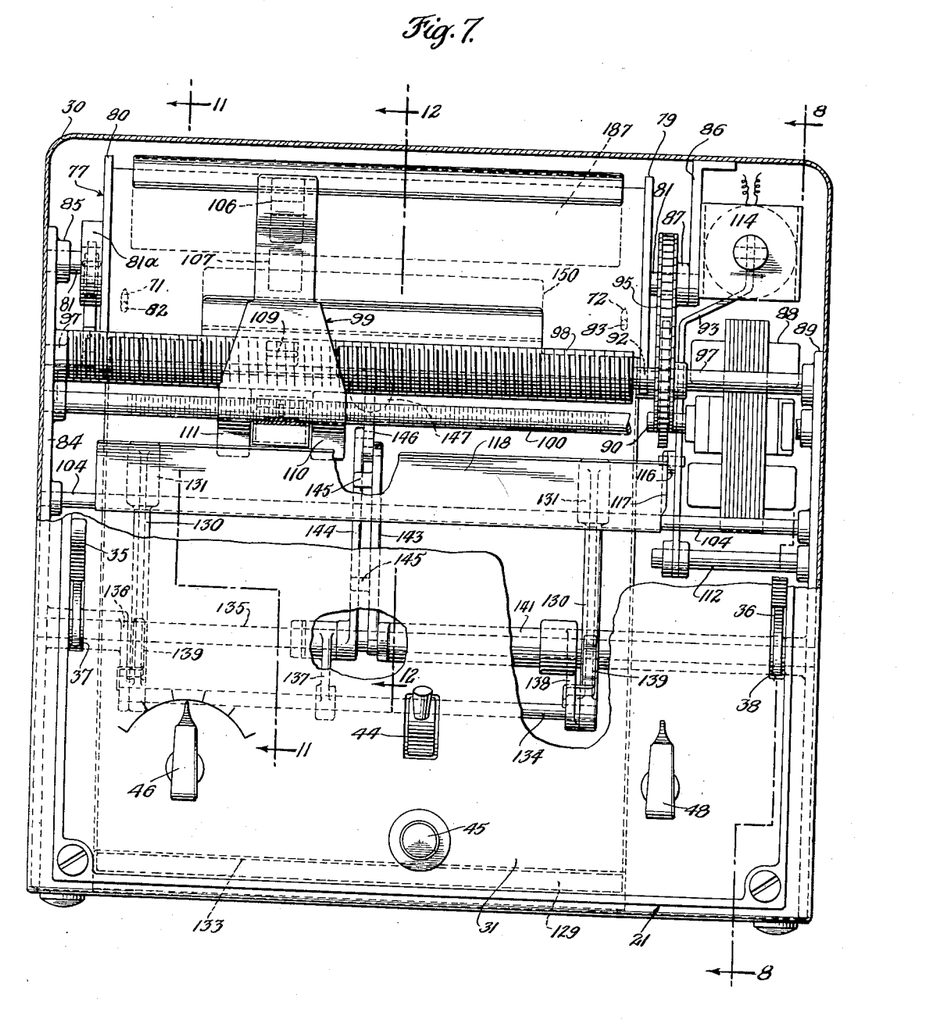
Figure 7 is a front view of the master unit shown in Figure 1, partly in elevation and partly in broken section.
Figure 8:
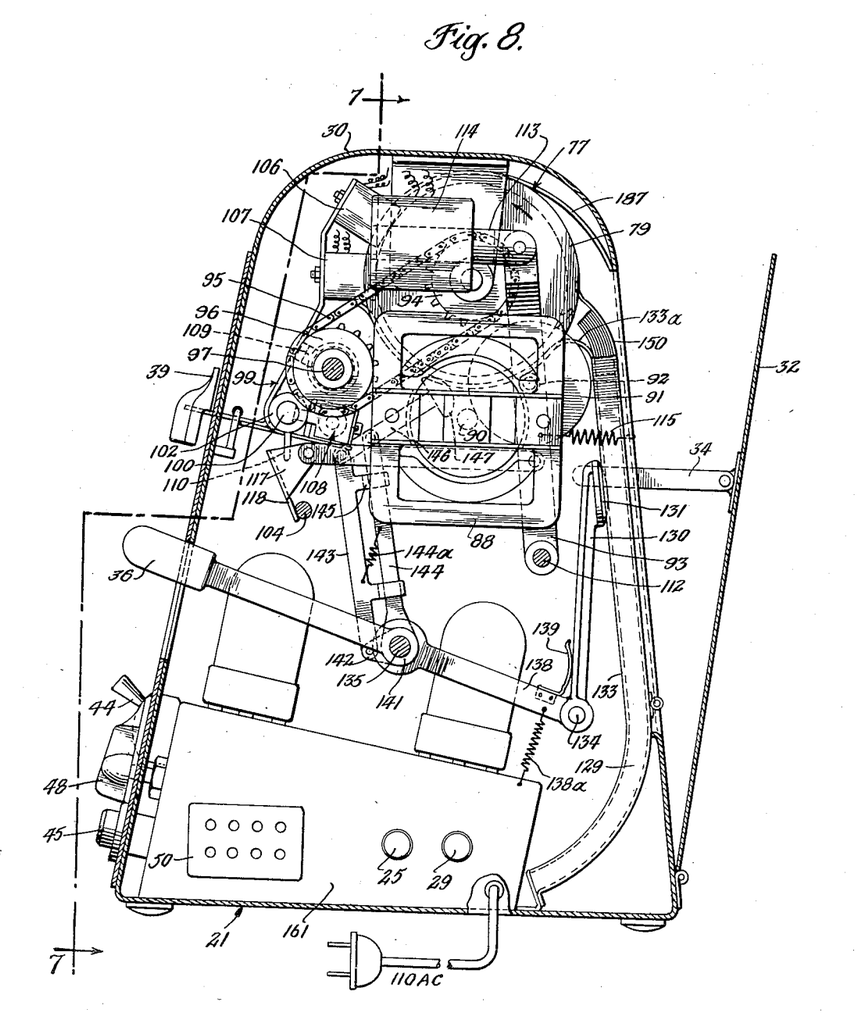
Figure 8 is a sectional view of the master unit, taken along the line 8—8 of Figure 7.

Cylindrical form 77 is mounted for rotation in the upper portion of cabinet 30, as may be seen in Figure 8. The left end of shaft 81 (see Figure 7) is journalled for rotation in side frame 84 and a pad 85 formed integrally therewith. The opposite, or right, end of shaft 81 is journalled in bracket 86 and pad 87.

Immediately below shaft 81 and to the right of drum 77 may be seen driving motor 88, mounted on side frame 89. Motor shaft 90 is in peripheral engagement with drive puck 91 (see Figures 9 and 10), which is mounted for rotation with a shaft 92, which shaft is journalled in shift arm 93. The operation of arm 93 will be described more fully hereinbelow; but it should be observed at this time that motion of arm 93 is adapted to carry puck 91 into and out of engagement with flange 79 of form 77, thus providing a selectively engageable drive from motor 88 to form 77.

VII. LEAD SCREW DRIVE

In addition to cylinder 77, shaft 81 also carries for rotation therewith a driving sprocket 94, located on the shaft between flange 79 and pad 87 (see Figures 7 and 8). Sprocket 94 carries a chain 95, which is in engagement with driven sprocket 96, secured to shaft 97 of lead screw 98. Lead screw shaft 97 is journalled at its left end in side frame 84 and at the opposite end in side frame 89.

It will thus be seen that the drive train for all rotating parts is: motor shaft 90, movable puck 91, puck shaft 92, flange 79, shaft 81, sprocket 94, chain 95, sprocket 96, shaft 97 and lead screw 98.

VIII. CARRIAGE AND CARRIAGE DRIVE

Lead screw 98 provides translational force for effecting movement of a portion of the mechanism axially of cylindrial form 77. This portion is mounted on a carriage 99 (see Figures 8, 9 and 15 for large scale view). Carriage 99 is supported by and is free for axial and rotational movement upon axial way 100, having a rack 101 cut along one side thereof. The actual bearing surfaces upon which the carriage rides are the internal surfaces of sleeves 102 and 103.

Figures 13, 14, 15:
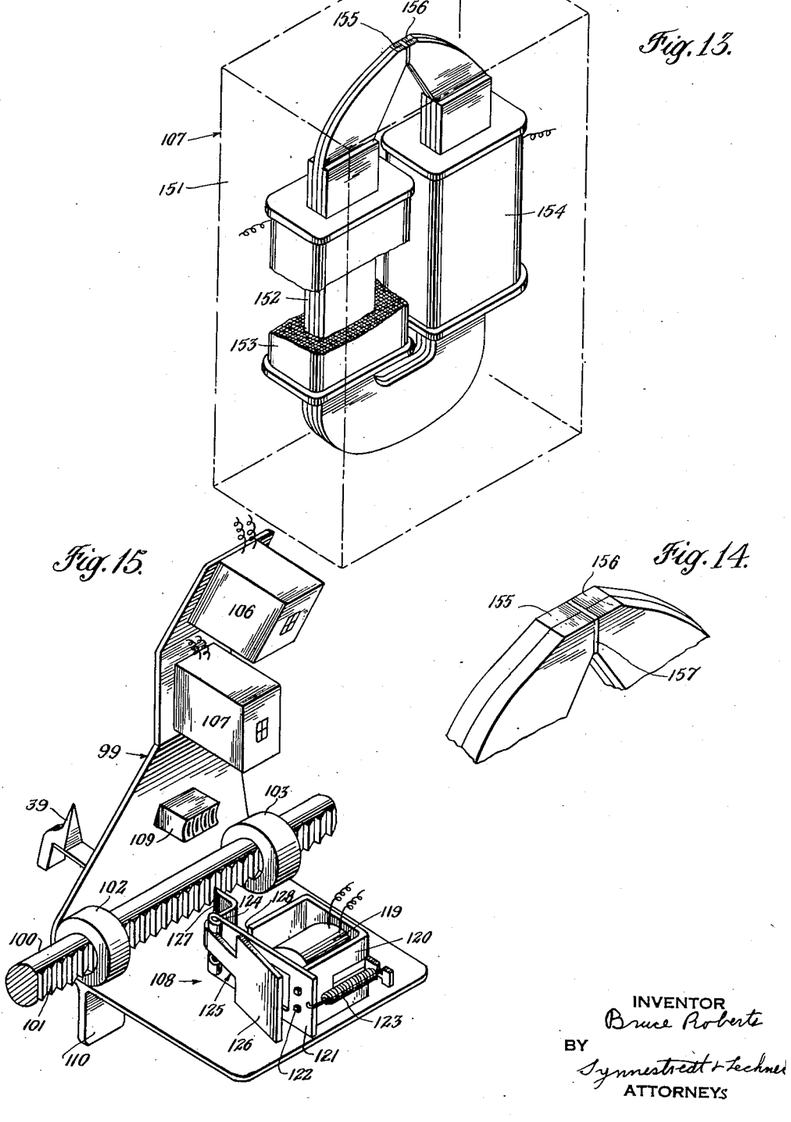
Figure 13 is an isometric view of a recording head.
Figure 14 is an enlarged isometric view of the recording head pole pieces.
Figure 15 is an isometric view of the recording head carriage and back spacing mechanism, on an enlarged scale.

Mounted on carriage 99 are erase head 106, recording head 107, back spacing mechanism generally indicated at 108, pointer 39, half-nut 109, and a pair of tabs 110 and 111. The mass of carriage 99 and its associated parts is distributed around axial way 100 in a manner to retain heads 106 and 107 against barrel 78 of cylindrical form 77, and to retain half-nut 109 in engagement with lead screw 99, by gravity. Tabs 110 and 111, which extend below axial way 100, provide a lever to which torque moments may be applied to remove the heads from the cylinder and the half-nut from the lead screw, as will appear more fully hereinbelow.

IX. CONTROL OF THE ROTATING COMPONENT OF THE SCANNING MECHANISM

Figures 9, 10:
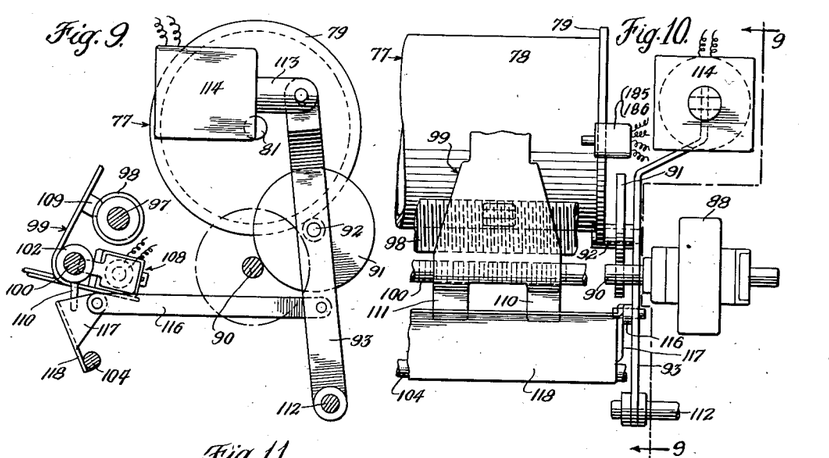
Figure 9 is a detailed view of parts shown in Figure 8.
Figure 10 is an elevation of portions of Figure 7, with certain parts removed.

Both the rotational drive train and the rotation of carriage 99 about axial way 100 are controlled by a single electro-mechanical control system, which is clearly illustrated in Figures 9 and 10. Shift arm 93 is mounted for swing motion at its lower extremity on shaft 112, which provides a reaction point for the arm. At its upper end, arm 93 is connected with armature 113 of solenoid 114, and intermediate its ends, arm 93 carries puck shaft 92, discussed above, a spring 115, and cross arm 116.

Spring 115 normally tends to pull arm 93 toward the rear of the machine, but exerts less force on the arm than does solenoid 114 when it is energized, with the result that the arm is held in its rearward position unless the solenoid is energized, under which condition it is pulled forward.

X. CONTROL OF THE TRANSLATING COMPONENT OF THE SCANNING MECHANISM

The front end of cross arm 116 is connected to tab 117 of trip bar 118, which is capable of rocking motion on shaft 104. As may be seen in Figure 7, trip bar 118 extends practically the full length of axial way 100, so that regardless of the position of carriage 99, trip bar 118 may be brought into position against tabs 110 and 111 of carriage 99. Figures 8 and 9 show the parts in the position they assume when solenoid 114 is energized—that is, with drive puck 91 in driving position, and trip bar 118 rocked forward, permitting the recording heads 106 and 107 to contact sheet 64 on cylinder 77, and permitting half-nut 109 to engage with lead screw 98. Under these conditions the cylinder rotates and the carriage is moved axially of the cylinder by the lead screw. Now, if the circuit to solenoid 114 be broken, spring 115 will pull arm 93 rearwardly, disengaging the drive puck, and rocking trip bar 118 to the rear. The trip bar, as will be seen, comes in contact with one or both of tabs 110 and 111, exerting a torque moment on carriage 99 around axial way 100, thus lifting the heads from the sheet and removing half-nut 109 from engagement with lead screw 98.

XI. THE SCANNING PATH

The combination of the rotating scanning component effected by rotation of cylinder 77 and the translating component effected by translational movement of carriage 99 on axial way 100 provides means for effecting movement of the recording head relative to the record medium in two directions substantially normal to each other. The interrelation of these two components makes possible the scanning of the entire record area in a series of side-by-side track portions. Preferably, the two components are interrelated in a manner to provide for simultaneous translational and rotational movement whereby to provide for a continuous helical track intersecting the line of overlapping of the opposite edges of the record sheet.

XII. CARRIAGE BACK SPACE

A second control system, 108, is completely carried by carriage 99, and serves to effect back spacing. This mechanism is shown in detail in Figure 15, and includes an electromagnet 119, a housing 120, and a non-magnetic member 121 hinged to the housing member at 122. A spring 123 exerts a turning moment on member 121 tending to carry free end 124 of member 121 away from the electromagnet. Hinged to member 121 at end 124 is an armature 125, one end 126 of the armature being in alignment with the core of the electromagnet and the other end bearing a pawl 127, adapted to engage rack 101 of axial way 100.

When electromagnet 119 is energized, member 121 is at first unaffected, but end 126 of armature 125 is drawn toward the core of the electromagnet, thereby forcing pawl 127 into engagement with rack 101. However, as soon as end 126 comes in contact with member 121, the turning movement on point 124 terminates, and the full force of the magnet on the armature is now transmitted to member 121, which turns on point 122. Tooth 127 now exerts an axial pressure on rack 101, advancing carriage 99 until member 121 abuts on housing 120 at point 128.

XIII. SEMI-AUTOMATIC RECORD LOADING

Figure 11:
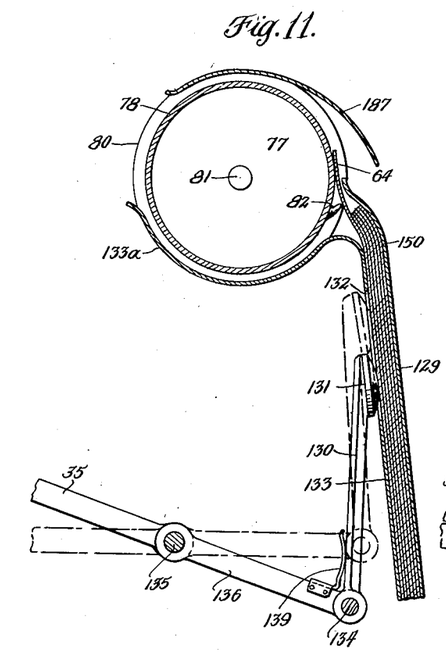
Figure 11 is a simplified view of the paper feed mechanism.

In addition to the mechanism for accomplishing scanning of a record sheet, as described above, cabinet 30 also contains semi-automatic means for loading and ejecting paper sheets. At the rear of the cabinet is a paper reservoir 129 (see Figures 7, 8 and 11) containing a number of sheets 64, as described above and illustrated in Figure 3. A pair of paper-fingers 130 having pads 131 are adapted to engage the forward sheet 64 in reservoir 129 through slots 132 in forward wall 133 of the reservoir. Fingers 130 are secured at their lower ends to a shaft 134, which is hung from a shaft 135 by three arms 136, 137, and 138. Arms 136 and 137 are secured to shaft 135 for rotation therewith, while arm 138 is loosely mounted for rotation on sleeve 141, serving merely to aid in aligning its end of shaft 134 and to afford a reaction point for a spring 139, which acts to force finger 130 against the paper. Each finger 130 is provided with such a spring, the left hand spring having for a reaction point arm 136. Rotation of shaft 135 is effected by moving lever 35. As will be seen, depressing lever 35 forces fingers 130 upwardly against the tension of spring 138a, and since pads 131 are coated to provide more friction between them and the sheet of paper 64 they contact than exists between that sheet and the adjacent sheet, the sheet is raised to a position where its upper edge enters the space between paper guide 187 and drum 77. As the cylinder rotates, hooks 82 and 83 enter holes 71 and 72 in sheet 64, drawing the sheet from the reservoir and wrapping it around the cylinder. Paper guide 187 and paper guide 133a maintain the sheet in its flexed form on cylinder 77.

XIV. SEMI-AUTOMATIC RECORD EJECTION

Figure 12:
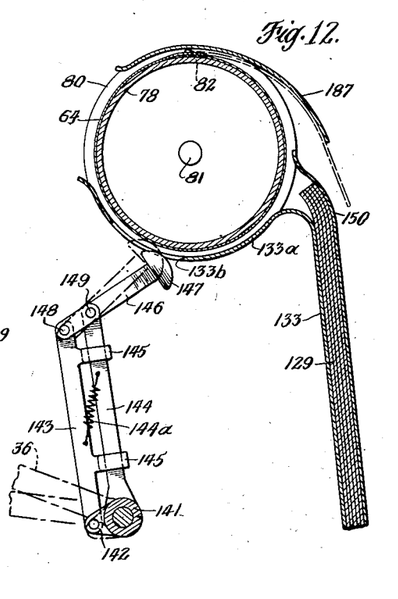
Figure 12 is a detailed view of the paper ejecting mechanism.

The paper ejection mechanism is illustrated in Figures 7, 8 and 12. A sleeve 141, rotatably mounted on shaft 135, is secured at one end to lever 36 and at the other to a crank 142 carrying a link 143. Adjacent link 143 is link 144, loosely mounted for rotation on shaft 135. Links 143 and 144 are kept in substantial axial alignment by pairs of loose fitting guides 145 formed on link 143. An ejection lever 146 carrying a pad 147 is secured to links 143 and 144 at 148 and 149 respectively.

When lever 36 is depressed, crank 142 rotates in a manner to shift link 143 downwardly relative to link 144 against the tension of spring 144a, raising pad 147 and moving it into engagement with drum 77 through slot 133b in paper guide 133a. When the pad can no longer swing upwardly, the whole assembly, consisting of crank 142, links 143 and 144, lever 146, and pad 147 will pivot about shaft 135, spinning drum 77 in a clockwise, or reverse, direction. Since the paper 64 on drum 77 has a natural tendency to straighten out, the sheet will peel off outside back wall 150 of reservoir 129 and be deposited between wall 150 and adjustable back panel 32.

In Figures 5 and 7 is illustrated mechanism for stopping the drum in a predetermined position prior to operating the ejection mechanism, in order to insure that the trailing edge of sheet 64 will be in the proper angular position in relation to back wall 150 of magazine 129. This mechanism includes a cam 81a mounted on drum shaft 81 adjacent one end of drum 77. Cam 81a has a circular profile interrupted by a depression. Switch 140 includes a rotating cam follower 140a adapted to engage with the depression to separate the switch contacts. Switch 140, together with push button switch 188 (see also Figure 1) serves to provide an additional path for energizing current for cylinder drive engaging solenoid 114. This circuit is completely independent of the normal operating circuit comprising foot switches 26 and 55 and limiting switch 186. When it is desired to eject a sheet, switch 188 is closed by the operator and solenoid 114 will be energized so long as cam follower 140a is in contact with the high portion of cam 81a. As a result, the drum will rotate until follower 140a drops into the depression separating the switch contacts, and de-energizing solenoid 114. The cylinder will stop in a position determined by the angular location of the depression. This angular position is arranged to correspond with a position of the trailing edge of sheet 64 appropriate to ejection in the desired direction. Preferably, as in the form illustrated, the depression is arranged to stop the cylinder when the trailing edge of sheet 64 is somewhat past the edge of rear wall 150 of the paper magazine which strips the sheet from the drum on reverse rotation thereof. Once the drum has been rotated to and stopped in this position, the paper is ejected by operation of lever 36 as described above.

XV. THE RECORDING AND ERASING HEADS

The electrical components of the device include two electromagnets 106 and 107 which serve as an erase head and a recording head respectively. Figure 13 is a phantom view of a recording head used in one embodiment of the invention. Shown in outline is housing 151 containing a laminated core 152, coils 153 and 154 and composite pole pieces 155 and 156. Figure 14 is a detailed view of the pole pieces of the recording head on an increased scale in which may be seen a non-magnetic spacer 157 which performs the function of maintaining the gap between pole pieces 155 and 156 constant.

As is well known in the art, the same electromagnet may be used both in recording and reproducing magnetic recordings, and accordingly, head 107 is connected to alternatively perform both of these functions, as will appear more fully hereinbelow.

Electromagnets 106 and 107 are mounted on carriage 99 with erase head 106 ahead of recording head 107 in a scanning sense. The equipment is arranged to provide for energization of the erase head during recording operations, so that any previously recorded material on a record sheet is obliterated just in advance of the recording head, whereby the recording head is always presented with an unrecorded record track. By this means a "double exposure" is impossible. Furthermore, it is unnecessary to perform any separate erasing operation inasmuch as a previously recorded but unwanted record sheet may be inserted and simultaneously erased and re-recorded. The switching arrangements include a circuit for rendering the erasing head ineffective during reproduction.

XVI. THE SPEAKER-MICROPHONES

It should be here stated that speaker-microphones 22 and 53, while they may take any form, preferably comprise in each case a single permanent magnet loudspeaker which, as is well known in the art, is capable of functioning either as a microphone or as a loudspeaker.

XVII. THE AMPLIFIER

Figure 16 is a schematic diagram showing an amplifier 158, power supply 159 and oscillator 160, all of which are mounted on chassis 161 (see Figure 8). While the amplifier, power supply and oscillator have been shown in separate dotted boxes, it is to be understood that this device is employed for clarity of description only and does not necessarily represent the physical organization of the parts. Amplifier 158 includes ungrounded input connection 162, grounded input terminal 163, ungrounded output terminal 164 and grounded output terminal 165. Power supply 159 includes a power transformer 166 having high voltage winding 167 and low voltage winding 168 which supplies filament voltage for all of the vacuum tubes and also delivers low voltage relay current to ungrounded terminal 169 and grounded terminal 170. In addition, primary voltage is delivered at terminals 171 and 172. Transformer primary 173 is adapted to be fed at terminals 174 and 175. It should be noted particularly that negative direct voltage lead 176 is not grounded but is connected to terminal 177. Oscillator 160 delivers high frequency voltage to ungrounded terminal 178 and grounded terminal 179. It should be noted at this time that one side of the amplifier input and output, oscillator output, and relay current output are grounded, and similarly, that one side of each of the speaker-microphones, erase and record heads, and various solenoids are grounded, making possible the interconnection of all of the above circuits by means of single pole switches.

XVIII. GENERAL DISCUSSION OF CABLING AND SWITCHING

Figure 17:
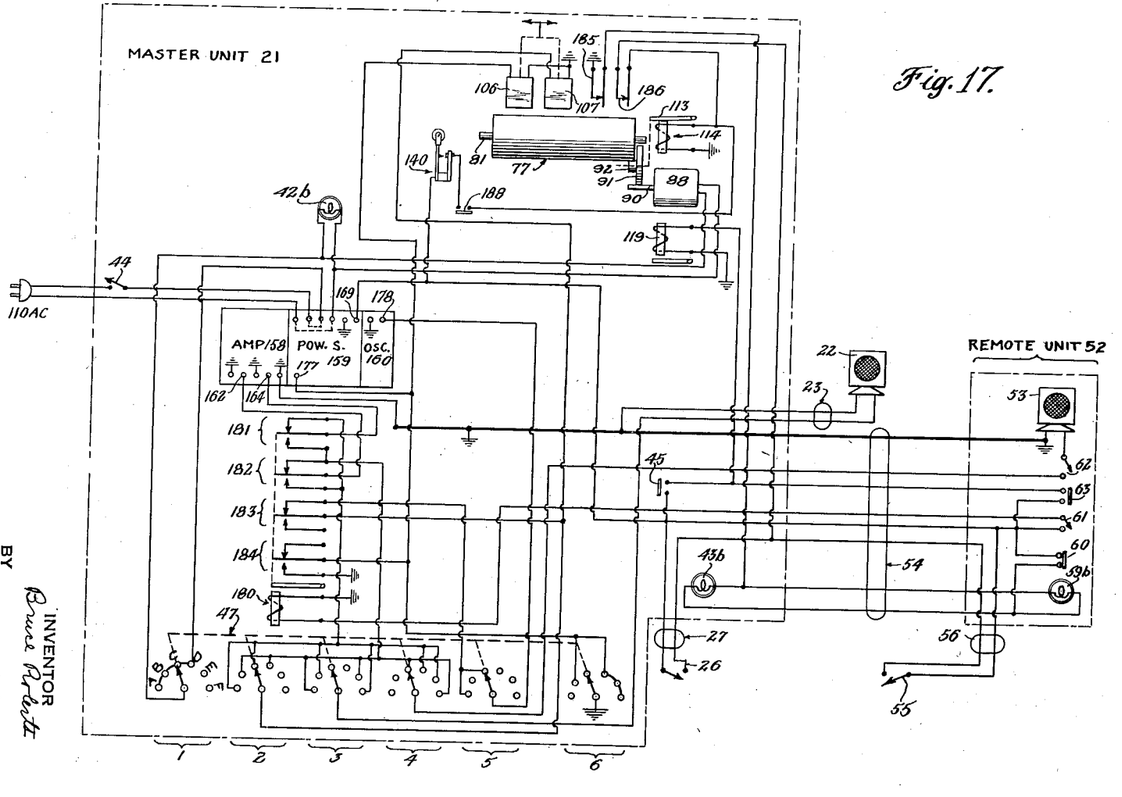
Figure 17 is a diagram of the switching and cabling circuits.

Figure 17 is a schematic diagram of a complete office dictation and intercommunication system laid out in accordance with the invention. As may be seen, master unit 21, diagrammatically indicated by the large dotted box, includes not only the record translating mechanism and the amplifier power supply and oscillator discussed above, but also includes gang switch 47 controllable at the master unit for establishing manual recording or reproducing or intercommunication conditions.

Master unit 21 also includes a multi-contact relay generally indicated at 180 and controlled by hold down toggle switch 61 in remote unit 52. Sections 181 and 182 of relay 180 serve to reverse the connections to the input and output of amplifier 158. Section 183 serves to connect the output of oscillator 160 to recording head 107 under the two operating conditions corresponding to recording. Section 184 of relay 180 serves to short circuit erase head 106 at all times except during recording.

XIX. INDEPENDENT OPERATION OF THE MASTER UNIT

Before considering the operation of the complete system, the operation of the master unit alone will first be considered. To make a recording, main power switch 44 is closed, the machine is loaded, as described in Section XIII, knob 46 of gang switch 47 is set to position A, "Local Record." In this position switch section 1 energizes drive motor 88, switch section 2 connects record head 107 to the output of amplifier 158 through section 181 of relay 180, and switch section 3 connects the local speaker-microphone 22 to the input of amplifier 158. Switch section 4 is inoperative in this position. Switch section 5 connects the output of oscillator 160 to record head 107. Switch section 6 is open, with the result that erase head 106 is in series with the negative high voltage lead 177. The device is now set for recording. The dictator now depresses foot switch 26 and speaks into speaker-microphone 22. The closing of switch 26 energizes solenoid 114, engaging the drive from motor 88 to drum 77 and lead screw 97. When pauses occur in dictation, the foot switch 26 is opened and closed again just prior to the continuation of dictation. If it should be desired to redictate a portion of the material, push button 45 is depressed once for each backward step desired until, for example, the carriage 99 has been carried back to a point somewhat before the point at which the redictation is to commence. Gang switch 46 is thrown to the "Local Play-Back" position (B) and foot switch 26 closed until the last of the material which is to be retained is heard, whereupon foot switch 26 is raised, knob 46 is again turned to position A and dictation resumed. Inasmuch as erase head 107 is energized during the dictation, the previously recorded material will be erased just priod to re-recording.

As carriage 99 approaches the end of drum 77, switch 185 opens and lamp 43b is extinguished. This serves as a warning that the recording space has been almost filled. Shortly thereafter, carriage 99 opens switch 186, which is unitarily mounted with switch 185, as shown in Figure 10, breaking the circuit to solenoid 114 and thus terminating the scanning. The recorded sheet may then be ejected by operation of paper ejection lever 36 as described in Section XIV, or the carriage may be returned to the left-hand side by moving pointer 39 with the fingers to the extreme left of scale 41, and the record reproduced by switching knob 46 to position A and depressing switch 26.

Thus, it may be seen that the first two positions of knob 46 and therefore of switch 47 correspond to recording from local microphone 22 and play back and reproducing a record at local speaker-microphone 22. When master unit 21 is operated independently, the relay 180 is never energized, and therefore only one set of connections is established by a given switch position. However, in Table A, I have listed the circuits which would be established if the relay were energized in order to maintain consistency with the description of the operation of switch 47 in the other operating positions.

Table A
POSITION AND FUNCTION—A LOCAL RECORD

| Switch Section and Function | Connection Relay Not Energized | Connection Relay Energized |
|---|---|---|
| 1. Motor | A. C. Supply | A. C. Supply. |
| 2. Recording Head | Amplifier Output. | Amplifier Input. |
| 3. Local Speaker-Microphone | Amplifier Input. | Amplifier Output. |
| 4. Remote Speaker-Microphone | | |
| 5. Oscillator | Recording Head. | |
| 6. Erase Head | On. | Grounded. |

POSITION AND FUNCTION—B LOCAL PLAY BACK

| Switch Section and Function | Connection Relay Not Energized | Connection Relay Energized |
|---|---|---|
| 1. Motor | A. C. Supply | A. C. Supply. |
| 2. Recording Head | Amplifier Input. | Amplifier Output. |
| 3. Local Speaker-Microphone | Amplifier Output. | Amplifier Input. |
| 4. Remote Speaker-Microphone | | |
| 5. Oscillator | | |
| 6. Erase Head | Grounded. | Grounded. |

XX. REMOTE OPERATION

As has been set forth above, it is contemplated that a master unit 21 will be employed in conjunction with a remote unit 52, whereby records may be made or reproduced by a person remote from the location of master unit 21. As may be seen in Figure 17, positions C and D of switch 47 correspond exactly to positions A and B, with the exception that the local speaker-microphone 22 is disconnected from the apparatus and that instead remote speaker-microphone 53 is connected by switch section 4. Switch sections 1, 2, 5 and 6 function both in recording and play back, as they do for positions A and B. Thus, with switch 47 in position C, a person at remote unit 52 may make a record controlling the engagement of the drive by means of foot switch 55 and controlling back spacing by means of push button 63. These controls are connected in parallel with the corresponding controls of master unit 21, and operate in exactly the same way. Similarly, lamp 59b is connected in parallel with lamp 43b and is controlled by warning switch 185 in exactly the same manner. As may be seen upon reference to the last column in Table B, included directly below, a person dictating at remote unit 52 may listen to what he has recorded either by instructing a person at the master unit to switch to position D, or, if the switch is set at position C, he may play back his record by operating relay 180, controlled by switch 61. The circuits established by switch 47 in positions C and D may be seen in Table B below.

Table B
POSITION AND FUNCTION—C REMOTE RECORD

| Switch Section and Function | Connection Relay Not Energized | Connection Relay Energized |
|---|---|---|
| 1. Motor | A. C. Supply | A. C. Supply. |
| 2. Recording Head | Amplifier Output. | Amplifier Input. |
| 3. Local Speaker-Microphone | | |
| 4. Remote Speaker-Microphone | Amplifier Input. | Amplifier Output. |
| 5. Oscillator | Recording Head. | |
| 6. Erase Head | On | Grounded. |

POSITION AND FUNCTION—D REMOTE PLAY BACK

| Switch Section and Function | Connection Relay Not Energized | Connection Relay Energized |
|---|---|---|
| 1. Motor | A. C. Supply | A. C. Supply. |
| 2. Recording Head | Amplifier Input. | Amplifier Output. |
| 3. Local Speaker-Microphone | | |
| 4. Remote Speaker-Microphone | Amplifier Output. | Amplifier Input. |
| 5. Oscillator | | |
| 6. Erase Head | Grounded. | Grounded. |

XXI. GENERAL DISCUSSION OF INTERCOMMUNICATION FEATURES

While it is thus possible to either produce or reproduce recordings at remote unit 52, the switching from position C to D must still be accomplished at master unit 21.

In order to coordinate the activities of persons at both operating positions, I have provided, in addition to the remote recording and reproducing circuits, two separate intercommunication circuits. One of these is visual and the other comprises a system of voice communication.

XXII. VISUAL INTERCOMMUNICATION

The visual system includes lamps 43b and 59b and push button 60. As will be seen from Figure 17, push button 60, which is normally closed, is in series with the energizing current to lamps 43b and 59b. By depressing push button 60 and thus breaking the circuit to the lamps, a person at remote unit 52 may break-and-make the circuit to lamp 43b, which is mounted behind bezel 43 on master unit 21, and thus may flash a signal to the person at the master unit 21.

XXIII. VOICE INTERCOMMUNICATION

The voice communication circuit includes amplifier 158, local speaker-microphone 22, and remote speaker-microphone 53, together with sections 3 and 4 of switch 47. As may be seen upon examination of the figure, in positions E and F, switch section 1 breaks the circuit to motor 88, switch section 2 breaks the circuit to recording head 107, switch section 5 breaks the circuit to oscillator 160, and switch section 6 short circuits erase head 106, connecting the negative high voltage lead 177 direct to ground. As may be seen from Table C, below, switch sections 3 and 4 in position E connect local speaker-microphone to the amplifier output and remote speaker-microphone to the amplifier input. In position F, these two switch sections reverse these connections. Thus, the operator of master unit 21 may speak to a person at remote unit 52 by turning control knob 46 to position F, and may listen to a person at remote unit 52 by turning control knob 46 to position E. There is thus established an intercommunication circuit between the two units under the control of the operator of master unit 21. In addition, sections 181 and 182 of relay 180 are arranged to invert the connections of the local speaker-microphone and the remote speaker-microphone to the amplifier when the relay is energized by closing switch 61 on remote unit 52. It will thus be apparent that when knob 46 is either in position E or F an intercommunication circuit is established between the two units which may be controlled by operation of switch 61. Table C illustrates connections established in positions E and F.

*Table C*

POSITION AND FUNCTION E LOCAL TO REMOTE INTERCOMMUNICATION

| Switch Section and Function | Connection Relay Not Energized | Connection Relay Energized |
|---|---|---|
| 1. Motor | | |
| 2. Recording Head | | |
| 3. Local Speaker-Microphone | Amplifier Input. | Amplifier Output. |
| 4. Remote Speaker-Microphone. | Amplifier Output. | Amplifier Input. |
| 5. Oscillator | | |
| 6. Erase Head | Grounded | Grounded. |

POSITION AND FUNCTION F INTERCOMMUNICATION REMOTE TO LOCAL

| Switch Section and Function | Connection Relay Not Energized | Connection Relay Energized |
|---|---|---|
| 1. Motor | | |
| 2. Recording Head | | |
| 3. Local Speaker-Microphone | Amplifier Output. | Amplifier Input. |
| 4. Remote Speaker-Microphone. | Amplifier Input. | Amplifier Output. |
| 5. Oscillator | | |
| 6. Erase Head | Grounded | Grounded. |

It should be noted at this time that remote unit 52 is provided with a privacy switch 62 connected in series with remote speaker-microphone 63, whereby a person at remote unit 52 may prevent eavesdropping by any one at position 21 by opening switch 62.

XXIV. PLURAL RECORDING

Figure 6:
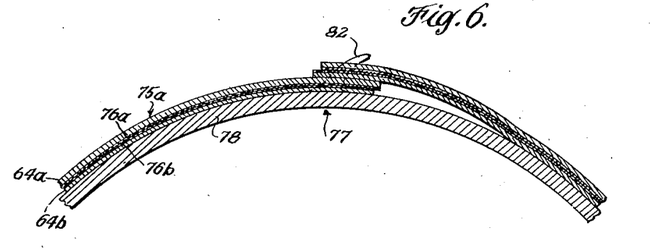
Figure 6 is a sectional view of a cylinder with two sheets of paper in position for recording in duplicate.

In addition to the functions of dictation, reproduction and intercommunication, the apparatus of the invention is adapted to the production of plural recordings. Although it will be understood by those skilled in the art that this novel recording apparatus makes possible the simultaneous recording of several letter type sheets by connecting an appropriate number of recording units together, I have found that even with one machine at least two layers of record sheet may be simultaneously recorded by the same recording head. In accordance with this aspect of the invention, a pair of record sheets 64a and 64b are mounted upon barrel 78 of cylindrical form 77, and when employing the preferred form of record sheet having a coating on one side, they are mounted with their coated surfaces 76a and 76b in juxtaposition, as illustrated in Figure 6. The two sheets are secured to form 77 in the usual manner by hooks 82 and 83 which penetrate holes 71 and 72. The recording is made through backing portion 75a of the outside sheet 64a. It should be pointed out that this technique depends upon the maintenance of positive alignment as between the two record sheets throughout the recording process. The method of securing the sheets to each other and to the cylinder illustrated in the figure—by means of hooks 82 and 83—results in effectively maintaining this alignment.

While I have found that the innermost layer is recorded at a somewhat lower signal level than the outer layer, this is of small consequence, since the level of reproduction may be controlled within wide limits by manipulation of volume control 49, and therefore, as will be understood, the second recording is eminently satisfactory as a file copy.

XXV. MODES OF OPERATION

The unitary devices may be employed without remote unit 52 and without the features of remote control and intercommunication. Under these conditions, local speaker-microphone 22 and foot switch 26 will be positioned at or near master unit 21, at the convenience of the person dictating. If the user of the apparatus desires to send a typewritten letter, he may dictate the material of the letter according to the technique outlined in Section XIX, whereupon the record may be played back by the person who is to transcribe it, or the sheet may be removed from the unit to be reinserted in another unit for transcription, or for transcription at a later time, using the same master unit. If the operator of a single master unit desires to transmit the record sheet to his correspondent without transcription, he operates the mechanism in accordance with Section XIX. If it is desired to retain a copy, two sheets are placed on the cylinder. Upon the conclusion of the dictation, the record sheet or sheets may be removed, identifying indicia applied as exemplified in Figure 3, the first sheet folded, and inserted in an envelope for transmission by mail to the correspondent, who, on receiving it, may reproduce the record by inserting it in this master unit 21 and following the procedure outlined in Section XIX. The file copy may be stored in flat or folded form as desired.

The operation of the complete system, including remote unit 52, involves two persons, for example, an executive stationed at remote unit 52, and his secretary stationed at master unit 21. Under these conditions it will be understood that complete voice intercommunication between the two parties is available when switch 47 is in position E or F, as outlined in Sections XXI and XXIII. If the switch has been left in either of these positions, for example, position E, the executive may communicate with his secretary by closing switch 61, operating relay 180. His voice will be reproduced at the master unit speaker-microphone. If switch 47 is in position F, he may speak to his secretary without operating the relay. If the switch is in one of the other four operating positions, he merely signals to his secretary by operating push button 60, breaking the circuit to lamp 43b, causing this lamp to go out, to switch to position F and establish voice communication. Having established communication with his secretary, the executive may then give her instructions appropriate to his next step; for example, he may say, "I want to dictate a letter," in which case she would set switch 47 in position C. The executive then dictates his letter into the speaker-microphone of remote unit 52, depressing foot switch 55 during the periods of active dictation and releasing it during pauses. If, at the conclusion of his dictation, the sheet has not been completely recorded, lamps 43b and 59b will still be illuminated, and he may communicate with his secretary by depressing push button 60 as before. If, on the other hand, his dictating should carry him to the end of the record sheet, switch 185 will be opened by carriage 99, darkening the lamps and signifying to both persons that a new sheet must be inserted. The secretary will then, as a matter of routine, insert another record and return the carriage to the starting position by pushing pointer 39 to the left-hand side of scale 41, whereupon the lights will again go on and the executive may resume his dictating. Upon completion of the letter, whatever its length, the secretary may be instructed to dispose of it either by transcribing it to typewritten form or by dispatching it immediately to its destination. Of course, duplicates may be made in exactly the same manner as outlined above.

XXVI. CONCLUSION

Thus, the invention provides for the immediate reduction of intelligence to a form of permanent record which is not only adapted to convenient transcription to some other form of record, but is also highly suited to storage or transmission without further effort on the part of the person with whom it originated.

The invention also exploits the unique capabilities of such a basic system by providing means for handling all the mechanical details of letter preparation at a position removed from the presence of its originator, leaving him free to concentrate his energies on the formulation of the letter.

Finally, the invention combines the speed and efficiency of direct recording with the ease and convenience of disposition confined heretofore to written records.

Beyond the immediately foregoing advantages which have heretofore never been realized, a dictating and intercommunication system established according to this invention performs with a minimum of apparatus and a maximum of convenience all of the conventional functions heretofore achieved in known systems only at the expense of employing awkward techniques involving a great multiplicity of equipment.

To illustrate, a system established according to this invention involves a single unit at the executive station and a single unit at the secretary's station. An ample supply of record sheets may be stored within the machine at the secretary's station. The executive's simple remote unit, which affords him facilities for dictating records, reproducing records, and communicating with his secretary in two directions, replaces the single function, mechanical sound-recording device formerly required, the single function intercommunication unit formerly required, and the storage facilities formerly required for blank records. At the secretary's station, the master unit of this invention replaces not only the single function transcriber of the prior art and the intercommunication unit familiar in many offices, but also the record shaver and the storage capacity necessary to maintain a supply of recorded and new record blanks.

In addition, while the complicated devices of the prior art theoretically relieved the secretary of the necessity of spending at least half of her time in taking dictation, they did so at the expense of adding to her burden the tasks of shaving old records and the lugging back and forth of freshly recorded and freshly shaved record blanks. According to the present invention, this fetching and carrying is replaced by instantaneous electronic transmission. The recording is made in the location and in the very machine where it is to be transcribed, if it is to be transcribed; and if it is not, it is at a place convenient for whatever other disposition has been designated for it.

I claim:

1. Apparatus for recording and reproducing intelligence on removable flexible sheets comprising magnetizable material, comprising a recording-reproducing head, an erasing head, mechanism for effecting scanning of a sheet by said heads, an amplifier having an input terminal and an output terminal, an oscillator having an output terminal for supplying recording bias, a power supply having a terminal for supplying erasing current, a first speaker-microphone unit, a second speaker-microphone unit, switch means for connecting either of said units to either of the amplifier terminals when the recording-reproducing head is connected to the other of the amplifier terminals, switch means for connecting either of the said units to either of the amplifier terminals when the other unit is connected to the other amplifier terminal, switch means for connecting the oscillator output terminal to the recording-reproducing head when the recording-reproducing head is connected to the amplifier output, and switch means for controlling the power supply to the erase head to energize said erase head when the record-reproduce head is connected to the amplifier output.

2. A dictation and intercommunication system comprising two stations, one of said stations comprising a speaker-microphone; and the other comprising a magnetic recording device adapted for use with foldable, rectangular record sheets and including a recording-reproducing head, and a second speaker-microphone; the system further including an amplifier having an input circuit and an output circuit, a pair of amplifier terminals, switch means for connecting each of said circuits to one of said terminals and for inverting the connections between the amplifier and the terminals, and additional switch means for connecting the head to either of said terminals and for connecting either of the speaker-microphones to either of said terminals, means for controlling one of said switch means from one station and means for controlling the other of said switch means from the other station.

3. A construction in accordance with claim 2 and further including at each station control means for initiating and terminating operation of said magnetic recording device.

4. A construction in accordance with claim 2 in which said magnetic recording device includes a recording bias supply for said head, said bias supply being controlled by both of said switch means.

5. A construction in accordance with claim 2 in which said magnetic recording device includes back spacing means and further including a control for said back spacing means at each of said stations.

6. In a dictation and intercommunication system, a first unit capable of producing recordings on foldable magnetic record blanks adapted to immediate disposition without transcription, comprising magnetic recording and reproducing mechanism, local speaker-microphone means control means for said mechanism, and means for selectively obliterating a portion of a recording and for concurrently rerecording in said portion; a second unit connected with said first unit and including speaker-microphone means and additional control means for said mechanism, said system further including control means for establishing a plurality of circuits whereby recordings may be made and reproduced at either of said units, and whereby voice communication can be established between said units, and control means in each of said units for controlling said rerecording means.

7. An office dictation and intercommunication system comprising two operating positions, the first operating position comprising a magnetic recording device adapted to produce and reproduce recordings in the form of flat, rectangular, flexible sheets carrying dispersed magnetizable particles and including a speaker-microphone, a recording head, an erasing head, means for translating said heads relative to a record in one direction said means being coordinated with means for bringing said heads into contact with a record, and additional means for effecting translational movements of said heads in the opposite direction, and control means for simultaneously bringing said heads into contact with the record and effecting said first translational movement, and further control means for effecting said reverse translational movement with said heads out of engagement with the record; and the second operating position comprising a speaker-microphone; and means at each operating position for initiating and terminating both of said translational movements.

8. An office dictation system comprising a secretary's equipment and an executive's equipment remote from the secretary's equipment, the secretary's equipment comprising recording mechanism for recording intelligence on record blanks, and the secretary's equipment further including means for locally reproducing recorded intelligence for purposes of transcription; and the executive's equipment including means for recording his dictation on a record at the secretary's station, and executive's equipment further including means for selectively rerecording a section of a record and for concurrently obliterating intelligence previous to rerecording in said section.

9. A dictation and intercommunication system comprising a first station including a first speaker-microphone and a second station including a second speaker-microphone, a record scanning mechanism, a magnetic recording-reproducing head, an amplifier, an erasing head, current supplying means therefor, primary switch means for connecting the amplifier input and output circuits with the speaker-microphones and the head in a plurality of combinations, each including the amplifier and two of the other three elements, and for controlling said current supply to energize said erase head when said recording-reproducing head is connected to the amplifier output, and secondary switch means for inverting the connections to the amplifier established by the primary switch means.

10. A construction in accordance with claim 9 and further including a source of biasing current for said head, said source being controlled by said primary and secondary switch means to bias said head only when said head is connected to the amplifier output.

11. A construction in accordance with claim 9 in which said supply is further controlled by said secondary switch means to cut off said current when the secondary switch means is operated to invert conditions established by operation of the primary switch means as described in claim 2.

12. A dictation and intercommunication system comprising two stations, one of said stations comprising a speaker-microphone; and the other comprising a magnetic recording device including a recording-reproducing head, and a second speaker-microphone; the system further including an amplifier having an input circuit and an output circuit, a pair of amplifier terminals, switch means for connecting each of said circuits to one of said terminals and for inverting the connections between the amplifier and the terminals, additional switch means for connecting the head to either of said terminals and for connecting either of the speaker-microphones to either of said terminals, means for controlling one of said switch means from one station and means for controlling the other of said switch means from the other station, and a signal device automatically operative after a predetermined period of operation of said magnetic recording device.

13. A construction in accordance with claim 12 in which said signal device is also adapted to be actuated manually from one of said stations.

BRUCE ROBERTS.

REFERENCES CITED

The following references are of record in the file of this patent:

UNITED STATES PATENTS

| Number | Name | Date |
|---|---|---|
| 788,790 | Pedersen | May 2, 1904 |
| 2,079,089 | Varley | May 4, 1937 |
| 2,284,306 | Sparling | May 26, 1942 |
| 2,333,235 | Calusen | Nov. 2, 1943 |

FOREIGN PATENTS

| Number | Country | Date |
|---|---|---|
| 541 | Great Britain | Jan. 8, 1904 |
| 611,840 | France | Oct. 12, 1926 |